US010496159B2

(12) United States Patent
Norden

(10) Patent No.: US 10,496,159 B2
(45) Date of Patent: Dec. 3, 2019

(54) USER INPUT PROCESSING WITH EYE TRACKING

(71) Applicant: SONY INTERACTIVE ENTERTAINMENT AMERICA LLC, San Mateo, CA (US)

(72) Inventor: Chris Norden, Austin, TX (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 15/296,552

(22) Filed: Oct. 18, 2016

(65) Prior Publication Data

US 2017/0139476 A1    May 18, 2017

Related U.S. Application Data

(63) Continuation of application No. 13/464,703, filed on May 4, 2012, now Pat. No. 9,471,763.

(51) Int. Cl.
*G06F 3/0488* (2013.01)
*G06F 21/32* (2013.01)
(Continued)

(52) U.S. Cl.
CPC .............. *G06F 3/013* (2013.01); *G06F 3/041* (2013.01); *G06F 3/0488* (2013.01); *G06F 21/32* (2013.01);
(Continued)

(58) Field of Classification Search
CPC ...... G06F 3/013; G06F 3/012; H04N 13/0484
See application file for complete search history.

(56) References Cited

U.S. PATENT DOCUMENTS 6,637,883 B1    10/2003  Tengshe et al.
8,922,480 B1 *  12/2014  Freed ....................... G09G 5/00
                                                        345/156
(Continued)

FOREIGN PATENT DOCUMENTS

CN    102034088 A    4/2011
IN    41/2015    10/2015
(Continued)

OTHER PUBLICATIONS

European Patent Application No. 13785175.4 Extended European Search Report dated Dec. 11, 2015.
(Continued)

*Primary Examiner* — Nitin Patel
*Assistant Examiner* — Amen Woldesenbet Bogale
(74) *Attorney, Agent, or Firm* — Polsinelli LLP

(57) ABSTRACT

A system determines which user of multiple users provided input through a single input device. A mechanism captures images of the one or more users. When input is detected, the images may be processed to determine which user provided an input using the input device. The images may be processed to identify each users head and eyes, and determine the focus point for each user's eyes. The user which has eyes focused at the input location is identified as providing the input. When the input mechanism is a touch screen, the user having eyes focused on the touch screen portion which was touched is identified as the source of the input.

24 Claims, 9 Drawing Sheets

(51) Int. Cl.
*G06F 3/041* (2006.01)
*G06F 3/01* (2006.01)
*G06K 9/00* (2006.01)
*G06F 9/00* (2006.01)

(52) U.S. Cl.
CPC .. *G06K 9/00597* (2013.01); *G06F 2221/2133* (2013.01)

(56) References Cited

U.S. PATENT DOCUMENTS

| | | | |
|---|---|---|---|
| 9,471,763 | B2 | 10/2016 | Norden |
| 2009/0273687 | A1* | 11/2009 | Tsukizawa .............. G06F 3/012 348/222.1 |
| 2010/0066667 | A1 | 3/2010 | MacDougall et al. |
| 2010/0125816 | A1* | 5/2010 | Bezos ................... G06F 1/1626 715/863 |
| 2010/0130280 | A1 | 5/2010 | Arezina et al. |
| 2010/0165093 | A1* | 7/2010 | Sugio ..................... A61B 3/113 348/78 |
| 2010/0225595 | A1 | 9/2010 | Hodges et al. |
| 2012/0033853 | A1 | 2/2012 | Kaneda et al. |
| 2012/0081392 | A1* | 4/2012 | Arthur ............... H04N 5/23222 345/633 |
| 2012/0105490 | A1* | 5/2012 | Pasquero ................ G06F 3/013 345/690 |
| 2013/0033524 | A1* | 2/2013 | Wang ..................... G06F 3/013 345/684 |
| 2013/0057573 | A1 | 3/2013 | Chakravarthula et al. |
| 2013/0145304 | A1 | 6/2013 | DeLuca et al. |
| 2013/0201305 | A1 | 8/2013 | Sibecas et al. |
| 2013/0293467 | A1 | 11/2013 | Norden |

FOREIGN PATENT DOCUMENTS

| | | |
|---|---|---|
| JP | 2006-201966 | 8/2006 |
| JP | 2007-136000 | 6/2007 |
| JP | 2012-065781 | 4/2012 |
| JP | 2015-521312 | 7/2015 |
| KR | 10-2015-0032661 | 3/2015 |
| WO | WO 2011/130594 | 10/2011 |
| WO | WO 2013/165646 | 11/2013 |

OTHER PUBLICATIONS

Korean Patent Application No. 2014-7030872 Notice of Preliminary Rejection dated May 3, 2016.
Japanese Patent Application No. 2015-510289 Notification of Reason(s) for Refusal dated Dec. 8, 2015.
PCT Application No. PCT/US2013/035331 International Search Report and Written Opinion dated Jan. 30, 2015.
U.S. Appl. No. 13/464,703 Office Action dated Jan. 7, 2016.
U.S. Appl. No. 13/464,703 Office Action dated Jul. 27, 2015.
U.S. Appl. No. 13/464,703 Final Office Action dated May 23, 2014.
U.S. Appl. No. 13/464,703 Office Action dated Nov. 20, 2013.
Chinese Patent Application No. 201380022450.4 Third Office Action dated May 3, 2018.
Chinese Patent Application No. 201380022450.4 Second Office Action dated Sep. 22, 2017.

* cited by examiner

USER INPUT PROCESSING WITH EYE TRACKING

CROSS-REFERENCE TO RELATED APPLICATIONS

This application is a continuation and claims the priority benefit of U.S. patent application Ser. No. 13/464,703 filed May 4, 2012, now U.S. Pat. No. 9,471,763 the disclosure of which is incorporated herein by reference.

BACKGROUND OF INVENTION

1. Field of the Invention

The present invention generally relates to input processing systems and more particularly to processing input from a plurality of users via image processing.

2. Description of the Prior Art

Computing system applications interact with users by receiving user input, processing the input, and providing a result. As systems become more advanced and more people embrace technology, applications have evolved to engage multiple users simultaneously. Multiple users may interact with computing systems at the same time, and the users may provide output that relates to a particular user. For example, two users may use game controllers to play a computer game that allows the users to compete against each other during a game session. Each user provides input with a respective gaming controller.

Technology has evolved to allow different types of interaction with computing systems. Rather than receiving input from a remote gaming controller for each user for example, some computing systems utilize a single input mechanism such as a touch screen. When only one user is engaging with the computing device, the single input mechanism receives input from the single user. When multiple users engage the computing system with a single input mechanism, it is very difficult to determine which user is providing the input.

There is a need in the art for a system that allows multiple users to easily and efficiently interact with a computing device using a single input mechanism.

SUMMARY OF THE CLAIMED INVENTION

In an embodiment, performance, functionality, content, or business relevancy. Based on learning techniques, efficient monitoring, and resource management, the present system may capture data for and provide analysis information for outliers of a web application with very low overhead.

In an embodiment, input may be received by first identifying a plurality of users physically in the presence of the device. An input may be received by the device from a first user of the plurality of physically present users. A physical state may be detected from one of the plurality of users associated with the input.

In an embodiment, a system for detecting input may include a display device, a camera, a processor and modules stored in memory and executable by the processor. The camera may capture color image data and provide the image data to the processor. A feature detection module is executable to detect a physical feature of a user. A user focus detection module detects the point of focus of a user's eyes. An input processing module receives and processes an input from a user.

DETAILED DESCRIPTION

Embodiments of the invention determine which user of multiple users provided input through a single input device. The computing system may include a mechanism for capturing images of the one or more users. The images may be processed to determine which user provided an input using the input device. For example, the images may be processed to identify each users head and eyes, and determine the focus point for each user's eyes. The user which has eyes focused at the input device is identified as providing the input. In embodiments where the input mechanism may be a touch screen, the user having eyes focused on the touch screen portion which was touched is identified to be providing the input.

Figure 1:
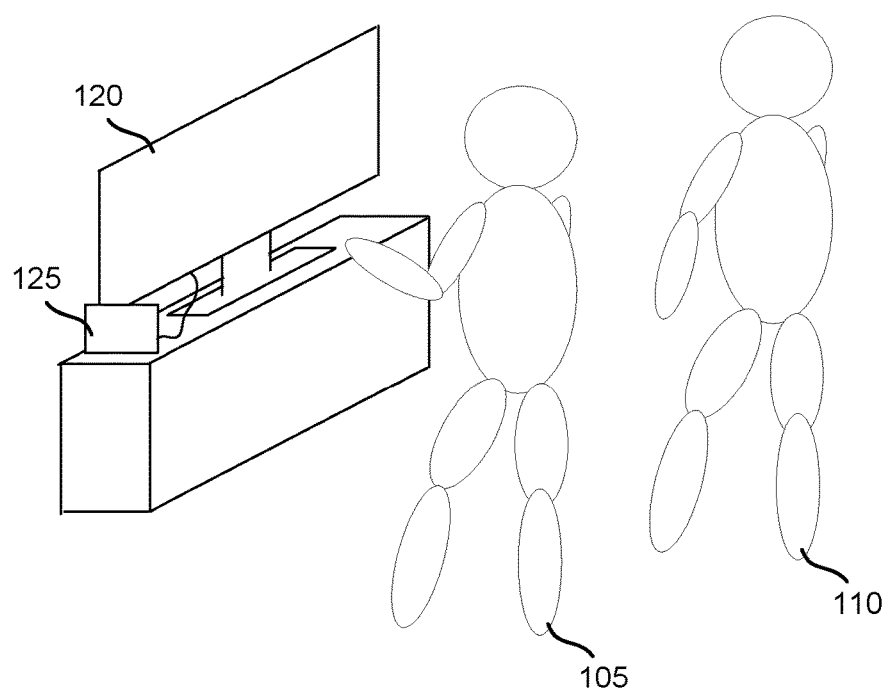
FIG. 1 is a block diagram of an exemplary system for receiving input through a touch screen of a computing console.
Figure 2:
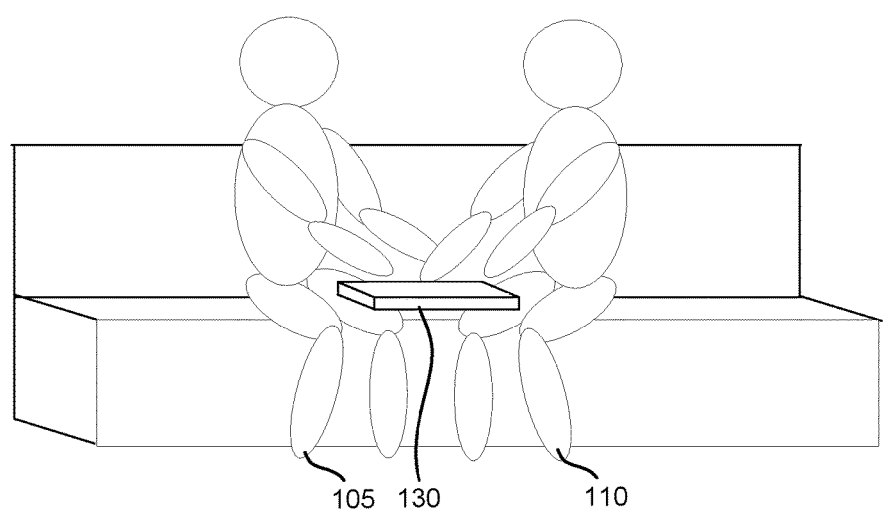
FIG. 2 is a block diagram of an exemplary system for receiving input through a touch screen of a tablet computer.
Figure 3:
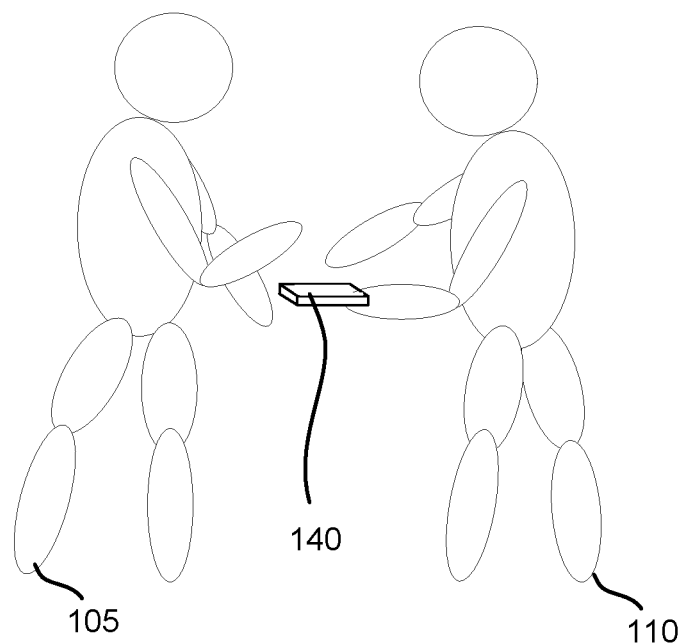
FIG. 3 is a block diagram of an exemplary system for receiving input through a touch screen of a mobile device.

Embodiments of the invention may be used with several types of computing devices. FIG. 1 is a block diagram of an exemplary system for receiving input through a touch screen of a computing console. A computing console 125 provides image data for display to touch screen 120. Touch screen 120 may receive touch input and provide the input computing console 125. The computing console may receive the input, process the input and create new image data, and provide the image data to touch screen 120. Any of users 105 and 110 may provide input to computing console 125, for example by touching touch screen 120. The present invention is able to determine which user touched the touch screen and process the input accordingly. FIG. 2 is a block diagram of an exemplary system for receiving input through a touch screen of a tablet computer 130. Users 105 and 110 may each provide input to tablet computer 130 using a touch screen of the tablet. Embodiments of the invention may determine which of users 105 and 110 provided input to the tablet computer 130 and process the input accordingly. FIG. 3 is a block diagram of an exemplary system for receiving input through a touch screen of a mobile device. Users 105 and 110 may each provide input to the mobile device 140 through touch screen or other input. The present invention may determine which user provided input to mobile device 140 and process the input for that user.

Figure 4:
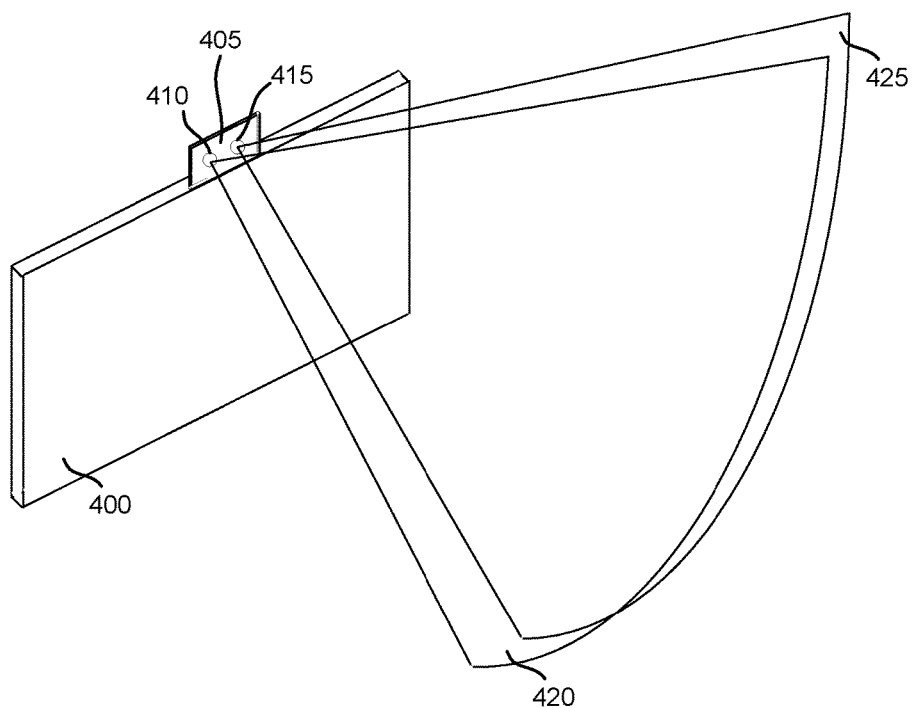
FIG. 4 is an exemplary computing device with user detection mechanism.

FIG. 4 is an exemplary computing device with user detection mechanism 45. User detection mechanism 405 may be used with a computing console, tablet compute, mobile device, or any other computing device. User detection mechanism includes color camera 410 and infra-red (IR) camera 415. Color camera 410 may capture images of an area 420 in the vicinity of the computing device. The images may be processed to identify users, physical features of users, and a state of the physical features. For example, images of two players captured by color camera 410 may be processed to identify two users within area 420, each user's physical features including user head and eyes, and the state of each user's eyes such as where each user is focusing their eyes. An IR imaging system 415 may also be used to capture and process images. The IR imaging system 415 may be utilized in low light conditions to capture IR images of area 425. The IR images may be processed to identify a number of users, user physical features, and feature states similar to the processing of color camera image processing.

Figure 5:
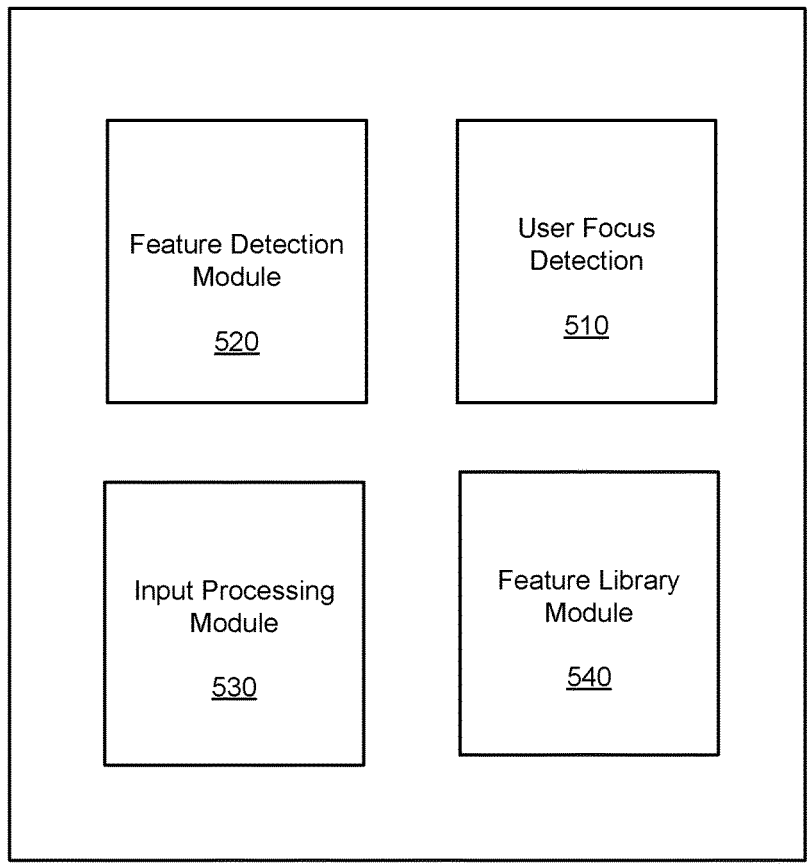
FIG. 5 is an exemplary set of executable software modules.

FIG. 5 is an exemplary set of executable software modules. The modules may be executed by a processor to implement various aspects of the invention described herein. A feature detection module 520 detects features in images of a user. For example, the feature detection module may receive an image, detect contours of a human face, and identify eyes within a face. Module 520 may have template of one or more faces to compare to portions of received images to identify a human face. The template may be stored in feature library module 540. In some embodiments, feature detection module 540 may detect motion between two or more consecutive images and use the change in pixel coloration to detect users. Once a user head is detected, the feature detection module analyzes features within the head to detect user's eyes. The eyes may be identified by detecting features such as a nose which are close to the eyes, determining that the user eyes are a certain distance below the top of the user's head, or perform other algorithms that are generally known in the art. In addition to physical features, other features may be determined as well, such as for example the distance a user is away from the computing device. In some embodiments, if a detected person is greater that a certain threshold distance from the computing device, the user will not be considered a user capable of providing input.

User focus module 510 may analyze images of a user's eye to determine where the user is focusing. The front of a human eye includes a black pupil, a colored iris around the pupil, and a white sclera around the iris. A computing device may analyze the area and location of the sclera to determine if a user is focused up, down, left and right. For example, when a user's eyes are focused on an object to his right, an image captured of the user's eyes will show more of the user's sclera on the right side of the eye in the image (the user's left side) than the left side, because the eyes will be moved towards the left side.

Input focusing module 530 receives input and processes the input. The input may be selection of a designated hot spot on a touch screen, a button, a wireless signal, or some other input. Input focusing module 530 may receive information from other modules which identify a user that has provided a recent input. The input processing module then processes the input as the identified user's action.

Feature library module 540 may include facial and eye masks, templates, models and other data used to process an image and identify a user physical feature and the feature state, such as which direction a user's eyes are focused at.

Figure 6:
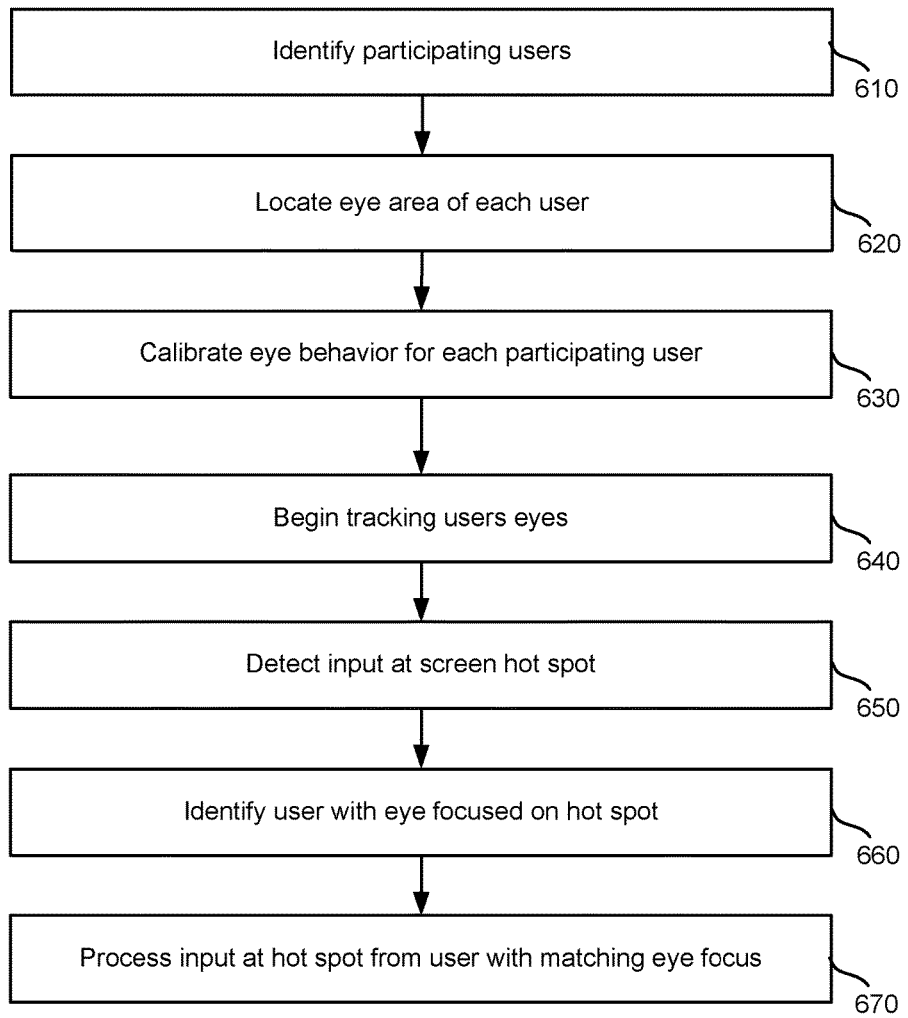
FIG. 6 is a flow chart of an exemplary method for identifying input from one of a plurality of users.

FIG. 6 is a flow chart of an exemplary method for identifying input from one of a plurality of users. The method of FIG. 6 may be performed by any of computing devices 120 and 125, 130 and 140. Participating users are identified by the computing device at step 610. The participating users are those that may provide input to the computing device. The participating users may be identified by registration with the system or image processing. Registration may include each user providing identification information of some sort, or an indication that they are present, to the computing device. Image processing may include capturing one or more images of an area from which users may provide input from, detecting the number of human heads, and assigning a value to each detected head. In some embodiments, both registration and image processing may be used to identify participating users.

A method for detecting a human head via image processing may begin with analyzing an image for shapes resembling a human head. Shapes may be identified using contrast detection, motion detection, and other techniques. Once a potential head shape is detected, the head candidate is analyzed for features common to most human heads. The features may include contrast, shading or other features present where a nose, mouth, or eyes may be. If the candidate head satisfies a threshold level of features, the head candidate may be identified as a participating user. Other methods for detecting faces in images are known in the art.

Figure 7A:
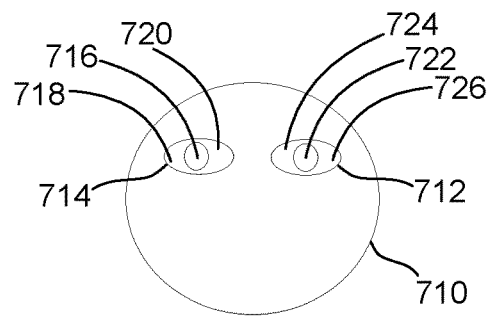
FIG. 7A-FIG. 7C are exemplary images of a user's eyes.
Figure 7B:
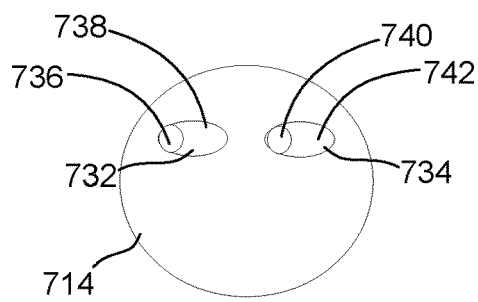
Figure 7C:
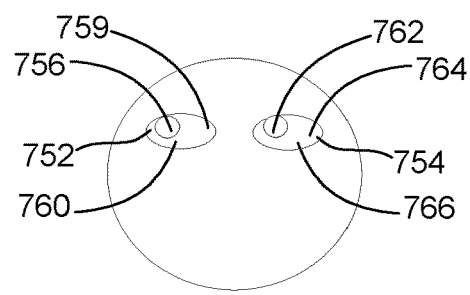

An eye area of each user is located at step 615. Detecting an eye area of a participating user's head may involve searching for a contrast, brightness, or other image property level at about the area within the head that the eye is located. Once the user eyes are located, eye behavior may be calibrated for each participating user at step 620. Calibration may include instructions on the screen to a participating user indicating a distance range from the computing device the user's face should, instructions to look at a particular point on the screen, and other directions. The calibration may have a user look at different points or hot spots on the display of the computing device, and analyze the images of the user's eyes when the focus of the user's eyes is known. For example, FIG. 7A-FIG. 7C illustrate a user head and eyes as the user eyes are focused on different areas. FIG. 7A illustrates a user head 710 with eyes 714 and 712. Eye 714 includes iris and pupil area 716 and sclera areas 718 and 720. Eye 712 includes iris and pupil area 722 and sclera areas 724 and 726. When the sclera areas to the left and right of the iris and pupil areas are about the same, the user may be determined to be focused about straight ahead. When the area of the sclera is much larger to the right of the iris and pupil area than the sclera area to the left of the pupil and iris, the user focus may be towards the right of the user (FIG. 7B). Similarly, when the area of the sclera is much larger to the right and underneath the iris and pupil area than the sclera area to the left and above the pupil and iris, the user focus may be towards the upper right of the user (FIG. 7C). The degrees of focus and corresponding focus point may be derived from taking a set of measurements of the user's eyes during calibration. The area and location of the user's pupil, sclera and other objects may be recorded for subsequently tracking user eyes.

Tracking of user eyes begins at step 625. The tracking involves capturing consecutive images of the user. The images may be processed to track and maintain knowledge of the user eye location and focus. In some embodiments, the images are captured repeatedly and stored, but are then discarded if not input is received from any user.

Input is detected at a screen hot spot at step 630. The input may include a user touching a hot spot on a touch screen for one of computing console 120, tablet computer 220, and mobile device 320. The hot spot may be a particular image object displayed on the screen, such as an image of a character, ball, virtual item, text, or other object. A user having eyes focused on the hot spot location of the input is identified at step 635. The eye location may be determined as discussed above with respect to the calibration process. A user corresponding to the particular input may be identified in a variety of ways. For example, the eye focus for each user may be determined, and the user with the eye focus closest to the hot spot may be selected. Alternatively, the eye focus for each user may be determined until an eye focus is detected within a threshold distance of the hot spot at which input was received. In some embodiments, a likelihood of input may be determined for each user based on their input history, their eye focus, whether an input is expected from the user, and so on. Once an input is associated with an identified user, the input at the hot spot is processed for the particular user at step 640.

Figure 8:
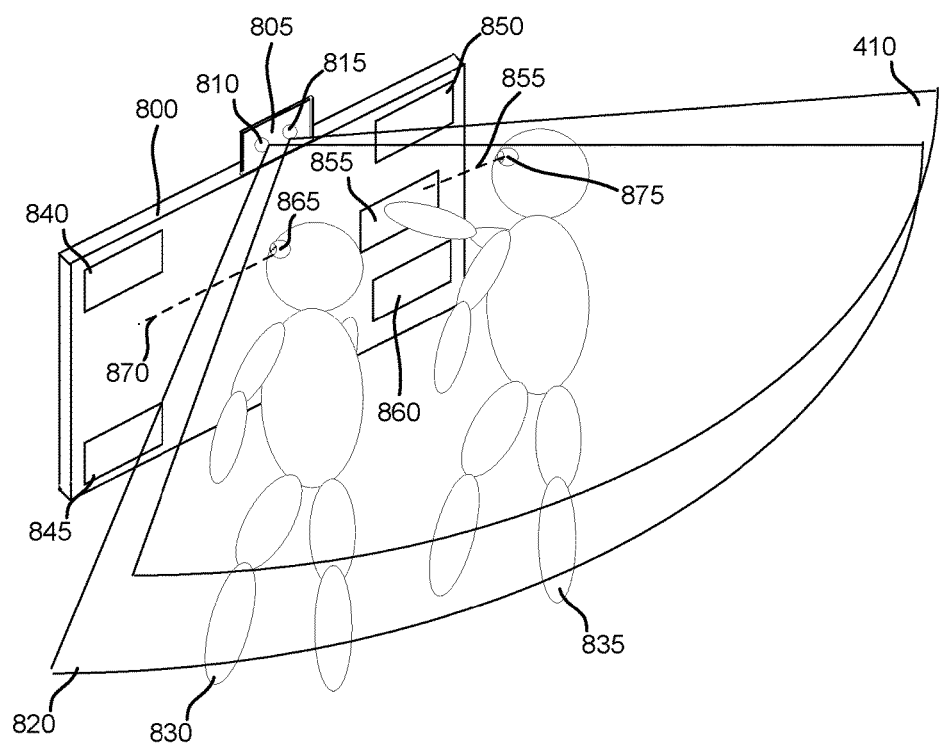
FIG. 8 is a block diagram of an exemplary computing device receiving input from one of multiple users.

FIG. 8 is a block diagram of an exemplary computing device receiving input from one of multiple users. Computing device 800 includes a camera system 805 (user detection system) with color camera 810 and IR camera 815. Users 830 and 835 are each in the range 820 of the color camera 810 and range 825 of the IR camera 815. The computing device 800 includes a touch screen having hot spots 840, 845, 850, 855, and 860. During calibration, the system may display text that asks the user to focus on a particular hot spot while the system captures an image of the user eyes.

When input is received, the computing device 800 determines the user focus and identifies the input as coming from the user focusing on the hot spot that received the input. For example, user 835 has provided input at hot spot 855 by pressing the screen at hot stop 855. Upon receiving the input, the processing device will analyze images captured from the color camera 810, IR camera 815, or both. From the images, the users focus will be determined. If after processing the images, user 830 is determined to have a focus of 870 and user 835 is determined to have focus 880 which corresponds to hot step 855, the input received at hot spot 855 will be associated with user 835. By determining where user eyes are focused, an input received through a device used by a plurality of players may be associated with one of a plurality of players.

Figure 9:
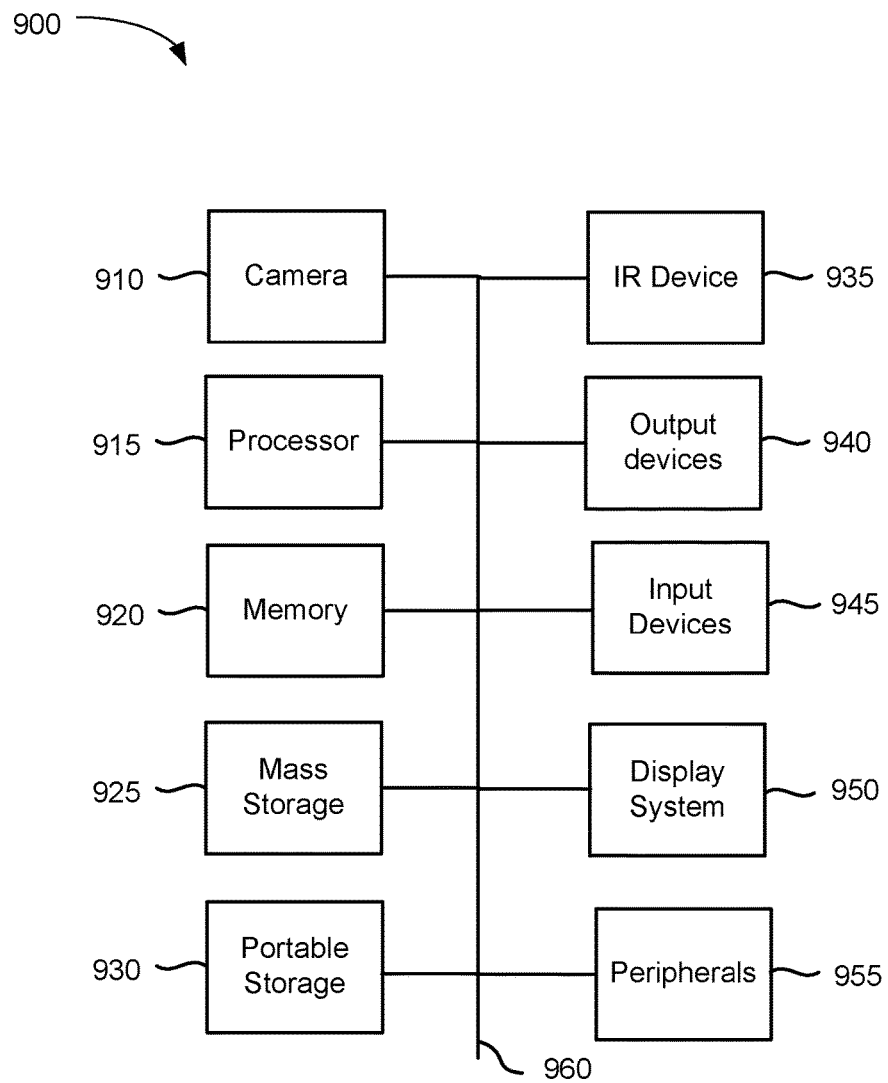
FIG. 9 is a block diagram of an exemplary system for implementing a computing device.

FIG. 9 illustrates an exemplary computing system 900 that may be used to implement a computing device for use with the present technology. System 900 of FIG. 9 may be implemented in the contexts of the likes computing console 120, tablet computer 220, and mobile device 320. The computing system 900 of FIG. 9 includes one or more cameras 910, processors 915 and memory 920. Main memory 920 stores, in part, instructions and data for execution by processor 915. Main memory 920 can store the executable code when in operation. The system 900 of FIG. 9 further includes a mass storage device 925, portable storage medium drive(s) 930, IR device 935, output devices 940, user input devices 945, a display 950, and peripheral devices 955.

Cameras 910 may include one more cameras able to capture a series of photos suitable for image processing analysis. The photos may be embedded within the computing system of mounted externally to the system. The images captured by camera 910 may be provided to processor 915 via bus 960, which may execute modules stored in memory 920 to analyze the images for features detection.

IR device 935 may include an IR camera that is able to capture images in very low light conditions. The IR images may be processed similarly as color camera images for user feature detection. The images captured from IR device 935 may be sent to processor 915 for processing via bus 960.

The components shown in FIG. 9 are depicted as being connected via a single bus 990. However, the components may be connected through one or more data transport means. For example, processor unit 915 and main memory 920 may be connected via a local microprocessor bus, and the mass storage device 925, peripheral device(s) 955, portable storage device 930, and display system 950 may be connected via one or more input/output (I/O) buses.

Mass storage device 925, which may be implemented with a magnetic disk drive or an optical disk drive, is a non-volatile storage device for storing data and instructions for use by processor unit 915. Mass storage device 925 can store the system software for implementing embodiments of the present invention for purposes of loading that software into main memory 920.

Portable storage device 930 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 930.

Input devices 945 provide a portion of a user interface. Input devices 945 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 940. Examples of suitable output devices include speakers, printers, network interfaces, and monitors.

Display system 950 may include a liquid crystal display (LCD) or other suitable display device. Display system 950 receives textual and graphical information, and processes the information for output to the display device. Display system 950 may include a touch screen device which receives input by detecting a touch on the surface of the display. The pixels receiving the touch are communicated to processor 915 via bus 960.

Peripherals 955 may include any type of computer support device to add additional functionality to the computer system. For example, peripheral device(s) 955 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

calibrating eye behavior of the at least one eye by taking a set of measurements to derive degrees of focus for each of a plurality of focus points within a display of the computing device, wherein each focus point is directed to one or more predefined input points within the display of the computing device;

tracking a location of a new focus point of the at least one eye of the identified human, wherein the location of the focus point is tracked within the display of the computing device;

identifying that an input has been received when the location of the tracked focus point corresponds to one of the predefined input points within the display of the computing device;

identifying that the predefined input point corresponding to the tracked focus point is at a location of a virtual item within the display;

identifying that the tracked focus point corresponds to the identified human of the at least one eye whose eye behavior had been calibrated; and processing the received input as an action performed at the virtual item located at the predefined input point corresponding to the tracked focus point, wherein the action performed at the virtual item is further associated with the corresponding identified human.

2. The method of claim 1, wherein identifying that the input has been received at the location of the virtual item comprises identifying an input likelihood.

3. The method of claim 1, wherein the camera that captures the image data includes an infra-red camera, and wherein the captured image data includes an infra-red image.

4. The method of claim 1, wherein the camera used to capture image data includes a color camera.

5. The method of claim 1, further comprising storing one or more templates of one or more faces in memory, wherein the threshold level of facial features is defined by one or more of the face templates.

6. The method of claim 1, wherein identifying the at least one candidate shape in the captured image data corresponds to the human comprises comparing pixel coloration between two or more consecutive images captured by the camera.

7. The method of claim 1, wherein identifying the at least one candidate shape in the captured image data corresponds to the human comprises detecting one or more facial features within the candidate shape.

8. The method of claim 1, wherein the physical area corresponds to a pre-determined distance from the computing device, and wherein candidate shapes outside the physical area are not considered.

9. The method of claim 1, wherein tracking the focus point of the at least one eye of the identified human includes identifying changes in a size of a first sclera area and a size of a second sclera area.

10. The method of claim 1, wherein calibrating the eye behavior of the at least one eye requesting the identified human to look at a calibration focus point.

11. The method of claim 1, further comprising identifying that the tracked focus point falls within a predetermined threshold distance to the corresponding predefined input point, wherein identifying that the input has been received is based on the tracked focus point falling within the predetermined threshold distance.

12. The method of claim 2, wherein identifying the input likelihood is based on at least one of input history, eye focus, and an input expectation.

13. The method of claim 1, wherein identifying that at least one candidate shape in the captured image data corresponds to the identified human present in the physical area comprises comparing a physical feature template to portions of the captured image data.

14. The method of claim 13, wherein comparing the physical feature template to portions of the captured image data is indicative of an identified feature state, and wherein identifying that an input has been received is further based on the identified feature state.

15. The method of claim 1, wherein a plurality of humans are identified as being present in the physical area, and wherein processing the received input associated with the corresponding identified human comprises selecting the corresponding identified human from the plurality of humans based on the distance of the location of the tracked focus point of the corresponding identified human to the corresponding predefined input point.

16. The method of claim 15, wherein a plurality of focus points are tracked for each of the humans, and further comprising comparing identified distances between each focus point of the plurality of focus points and each of the predefined input points within the display.

17. The method of claim 1, wherein a different type of input is associated with each different one of the predefined input points, and wherein a corresponding action specific to each different predefined input point is different from the action specific to the predefined input point corresponding to the tracked focus point.

18. The method of claim 1, wherein identifying that at least one candidate shape in the captured image data corresponds to the human present in the physical area further comprises detecting motion between a plurality of images.

19. A non-transitory computer-readable storage medium, having embodied thereon a program executable by a processor to perform a method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

calibrating eye behavior of the at least one eye by taking a set of measurements to derive degrees of focus for each of a plurality of focus points within a display of the computing device, wherein each focus point is directed to one or more predefined input points within the display of the computing device;

tracking a location of a new focus point of the at least one eye of the identified human, wherein the location of the focus point is tracked within the display of the computing device;

identifying that an input has been received when the location of the tracked focus point corresponds to one of the predefined input points within the display of the computing device;

identifying that the predefined input point corresponding to the tracked focus point is at a location of a virtual item within the display;

identifying that the tracked focus point corresponds to the identified human of the at least one eye whose eye behavior had been calibrated; and processing the received input as an action performed at the virtual item located at the predefined input point corresponding to the tracked focus point, wherein the the action performed at the virtual item is further associated with the corresponding identified human.

20. A system for identifying user input at a computing device, the system comprising:

a camera that captures image data for a physical area surrounding the computing device;

a display of the computing device, the display comprising one or more predefined input points; and a processor that executes non-transitory computer readable instructions stored in memory of the computing device, wherein execution of the instructions by the processor:

identifies at least one candidate shape corresponds to a human present in the physical area based on the at least one candidate shape meeting a threshold level of facial features including at least one eye of a human;

calibrates eye behavior of the at least one eye by taking a set of measurements to derive degrees of focus for each of a plurality of focus points within the display of the computing device, wherein each focus point is directed to one or more of the predefined input points within the display of the computing device;

tracks a location of a new focus point of the at least one eye of the identified human, wherein the location of the focus point is tracked within the display of the computing devices, identifies that an input has been received when the location of the tracked focus point corresponds to one of the predefined input points within the display of the computing device, identifying that the predefined input point corresponding to the tracked focus point is at a location of a virtual item within the display;

identifies that the tracked focus point corresponds to the identified human of the at least one eye whose eye behavior had been calibrated, and processes the received input as an action performed at the virtual item located at the predefined input point corresponding to the tracked focus point, wherein the the action performed at the virtual item is further associated with the corresponding identified human.

21. A method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

calibrating eye behavior of the at least one eye by taking a set of measurements to derive degrees of focus for each of a plurality of focus points within a the display of the computing device, wherein each focus point is directed to one or more predefined input points within the display of the computing device;

tracking a location of a new focus point of the at least one eye of the identified human, wherein the location of the new focus point is tracked within the display of the computing device;

identifying that an input has been received based on an action performed by the identified human when the location of the tracked focus point corresponds to one of the predefined input points within the display of the computing device;

identifying that the tracked focus point corresponds to the identified human of the at least one eye whose eye behavior had been calibrated and that the action is associated with a location of a virtual item based on the tracked focus point corresponding to the action and the location of the virtual item; and processing the received input as an action specific to the predefined input point corresponding to the tracked focus point, wherein the received input is further associated with the corresponding human based on the correspondence of the tracked focus point to the action and the location of the virtual item.

22. A method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

calibrating eye behavior of the at least one eye by taking a set of measurements to derive degrees of focus for each of a plurality of focus points within a the display of the computing device, wherein each focus point is directed to one or more predefined input points within the display of the computing device;

tracking a location of a new focus point of the at least one eye of the identified human, wherein the location of the new focus point is tracked within the display of the computing device;

identifying that a touch input has been received when the location of the tracked focus point corresponds to one of the predefined input points within the display of the computing device;

identifying that the tracked focus point and the touch input corresponds to the human of the at least one eye whose eye behavior had been calibrated based on the touch input corresponding to an area of the display that coincides with tracked focus point in time when the touch input was received; and processing the received input as an action specific to the predefined input point corresponding to the tracked focus point, wherein the received input is further associated with the corresponding human based on the correspondence of the touch input and the tracked focus of the calibrated at least one eye of the identified human.

23. A method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

identifying that the human is within a range of distance associated with an expectation that a user located with the range of distance is capable of providing user input via one or more predefined input points within a display of the computing device;

calibrating eye behavior of the at least one eye by taking a set of measurements to derive degrees of focus for each of a plurality of focus points within the display of the computing device, wherein each focus point is directed to the one or more predefined input points within the display of the computing device;

tracking a location of a new focus point of the at least one eye of the identified human, wherein the location of the new focus point is tracked within the display of the computing device;

identifying that an input has been received when the location of the tracked focus point corresponds to one of the predefined input points within the display of the computing device based on the identification that the human is located within the range of distance;

identifying that the tracked focus point corresponds to the human of the at least one eye whose eye behavior had been calibrated; and processing the received input as an action specific to the predefined input point corresponding to the tracked focus point, wherein the received input is further associated with the corresponding human.

24. A method for identifying user input at a computing device, the method comprising:

capturing image data for a physical area surrounding the computing device, the image data captured by a camera;

identifying that at least one candidate shape in the captured image data corresponds to a human present in the physical area based on the at least one candidate shape meeting a threshold level of facial features including at least one eye of the human;

calibrating eye behavior of the at least one eye by taking a set of measurements of a plurality of areas included in the at least one eye to derive degrees of focus for each of a plurality of focus points within a display of the computing device, the plurality of areas including a first sclera area, a second sclera area, and an iris-pupil area, wherein each focus point is directed to one or more predefined input points within the display of the computing device and each focus point is identified by comparing the size of the first sclera area and the size of the second sclera area relative to a location of the iris-pupil area;

tracking a location of a new focus point of the at least one eye of the identified human, wherein the location of the focus point is tracked within the display of the computing device;

identifying that an input has been received when the location of the tracked focus point corresponds to one of the predefined input points within the display of the computing device;

identifying that the tracked focus point corresponds to the human of the at least one eye whose eye behavior had been calibrated; and processing the received input as an action specific to the predefined input point corresponding to the tracked focus point, wherein the received input is further associated with the corresponding human.

* * * * *